(12) United States Patent
Balidas et al.

(10) Patent No.: US 11,130,684 B2
(45) Date of Patent: Sep. 28, 2021

(54) WATER SOFTENING DEVICE AND METHOD OF OPERATING A WATER SOFTENING DEVICE

(71) Applicant: BWT Aktiengesellschaft, Mondsee (AT)

(72) Inventors: Pierre Balidas, Bloomfield, NJ (US); Christian Brand, Brunstatt (FR); Jürgen Johann, Nußloch (DE); Andrea Pavan, Cittadella (IT)

(73) Assignee: BWT Aktiengesellschaft, Mondsee (AT)

( * ) Notice: Subject to any disclaimer, the term of this patent is extended or adjusted under 35 U.S.C. 154(b) by 171 days.

(21) Appl. No.: 16/472,024

(22) PCT Filed: Feb. 1, 2018

(86) PCT No.: PCT/EP2018/052571
§ 371 (c)(1),
(2) Date: Jun. 20, 2019

(87) PCT Pub. No.: WO2018/146002
PCT Pub. Date: Aug. 16, 2018

(65) Prior Publication Data
US 2019/0352198 A1  Nov. 21, 2019

(30) Foreign Application Priority Data
Feb. 7, 2017 (EP) .................................. 17155008

(51) Int. Cl.
*B01J 39/07* (2017.01)
*B01J 47/14* (2017.01)
(Continued)

(52) U.S. Cl.
CPC ................. *C02F 1/42* (2013.01); *B01J 39/07* (2017.01); *B01J 39/18* (2013.01); *B01J 47/024* (2013.01);
(Continued)

(58) Field of Classification Search
CPC ...... C02F 1/008; C02F 1/42; C02F 2001/425; C02F 2209/05; C02F 2209/445; B01J 39/07; B01J 47/14
See application file for complete search history.

(56) References Cited

U.S. PATENT DOCUMENTS

2009/0211919 A1*  8/2009  Hegel ..................... C02F 1/42
                                                              205/633
2010/0294653 A1  11/2010  Kiefer et al.
(Continued)

FOREIGN PATENT DOCUMENTS

DE     10 2010 003 636 A1    10/2011
EP           3 034 474 A1     6/1916
(Continued)

OTHER PUBLICATIONS

Office Action and its Search Report, both dated Mar. 16, 2020, of counterpart Russian Application No. 2019126737.
(Continued)

*Primary Examiner* — Bradley R Spies
(74) *Attorney, Agent, or Firm* — DLA Piper LLP (US)

(57) ABSTRACT

A water softening device includes a filter configured to decrease hardness of a first stream of raw water to produce a second stream of water with decreased hardness, a first sensor that measures an electrical property of the first stream, a second sensor that measures an electrical property of the second stream, and optionally, a third sensor that detects a water flow through the filter, wherein the filter includes an ion exchange resin operated in $H^+$-mode, and the
(Continued)

filter is buffered with at least one salt selected from the group of a potassium salt (K$^+$), a sodium salt (Na$^+$) and a lithium salt (Li$^+$).

16 Claims, 6 Drawing Sheets

(51) Int. Cl.
    *C02F 1/00*     (2006.01)
    *C02F 1/42*     (2006.01)
    *B01J 39/18*     (2017.01)
    *B01J 47/024*     (2017.01)

(52) U.S. Cl.
    CPC ............... *B01J 47/14* (2013.01); *C02F 1/008* (2013.01); *C02F 2001/425* (2013.01); *C02F 2201/006* (2013.01); *C02F 2201/007* (2013.01); *C02F 2209/05* (2013.01); *C02F 2209/445* (2013.01); *C02F 2301/043* (2013.01)

(56) References Cited

U.S. PATENT DOCUMENTS

| | | |
|---|---|---|
| 2011/0168637 A1 | 7/2011 | Quinn |
| 2013/0328579 A1 | 12/2013 | Whitehead et al. |
| 2014/0054211 A1* | 2/2014 | Conradt .................. C02F 1/003 210/264 |

FOREIGN PATENT DOCUMENTS

| | | |
|---|---|---|
| EP | 1 002 582 A1 | 5/2000 |
| EP | 2 481 713 A1 | 8/2012 |
| EP | 2 952 481 A1 | 12/2015 |
| JP | S60-172391 | 9/1985 |
| JP | H09-271769 | 10/1997 |
| JP | 2006-281216 | 10/2006 |
| JP | 2008-535647 | 9/2008 |
| JP | 2013-505834 | 2/2013 |
| RU | 2440302 C2 | 1/2012 |
| RU | 2549864 C2 | 4/2015 |
| WO | 2006/095282 | 9/2006 |
| WO | 2011/041444 | 4/2011 |

OTHER PUBLICATIONS

Notice of Reason for Rejection dated Jul. 30, 2021, of counterpart Japanese Application No. 2019-531462, along with an English translation.

* cited by examiner

WATER SOFTENING DEVICE AND METHOD OF OPERATING A WATER SOFTENING DEVICE

TECHNICAL FIELD

This disclosure refers to a water softening device and a method of operating a water softening device.

BACKGROUND

Water softening methods are well known and typically involve a pressurized water treatment wherein a water stream is passed through a filter comprising a cation exchange material (either inorganic or organic), thereby producing softened water that is desirable for household applications like laundering, bathing and dish washing, devices like coffee machines, in particular those with steam production, as well as many industrial applications.

The main purpose of water softening is to protect devices from lime scale. This is accomplished by exchanging calcium and magnesium ions (the so-called hardness) in a water stream, for example, for sodium or potassium ions.

Other filters containing a weak acid cationic ion exchange resin (WAC) as cation exchange material. Such filters exchange the hardness against protons. This means that water softening is accompanied by a drop of pH of the treated water.

Each cation exchange material has a defined capacity corresponding to the amount of cations that can be exchanged against hardness. The volume of water that can be treated by the filter before the filter is exhausted and needs to be replaced depends on the composition of the treated water. For obvious reasons it is advantageous to have an indicator for the exhaustion state of the filter.

Classically, the criteria used to determine the exhaustion state of a filter is the pH value of a water stream after treatment by the filter comprising the cation exchange material. Usually below a pH value of 6.8 the protection against lime scale is ensured. When the exhaustion rate of the filter has progressed to a point at which the pH exceeds a value of 6.8, the filter needs to be replaced.

For several reasons the direct determination of the pH value of the water stream after treatment is not an optimum choice to determine the exhaustion state. The price of pH measurements is one aspect. The fact that pH sensors need frequent calibrations is another aspect. The optimum solution should be cost efficient and autonomous.

It could therefore be helpful to provide a solution to the problem of indicating the exhaustion state of a filter for a water softening process.

SUMMARY

We provide a water softening device including a filter configured to decrease hardness of a first stream of raw water to produce a second stream of water with decreased hardness, a first sensor that measures an electrical property of the first stream, a second sensor that measures an electrical property of the second stream, and optionally, a third sensor that detects a water flow through the filter, wherein the filter includes an ion exchange resin operated in $H^+$-mode, and the filter is buffered with at least one salt selected from the group of a potassium salt ($K^+$), a sodium salt ($Na^+$) and a lithium salt ($Li^+$).

We also provide a method of operating the water softening device, including a filter configured to decrease hardness of a first stream of raw water to produce a second stream of water with decreased hardness, a first sensor that measures an electrical property of the first stream, a second sensor that measures an electrical property of the second stream, and optionally, a third sensor that detects a water flow through the filter, wherein the filter includes an ion exchange resin operated in $H^+$-mode, and the filter is buffered with at least one salt selected from the group of a potassium salt ($K^+$), a sodium salt ($Na^+$) and a lithium salt ($Li^+$), passing a first stream of raw water through a filter configured to decrease hardness of the stream to produce a second stream of water with decreased hardness, measuring an electrical property of the first stream with a first sensor, measuring an electrical property of the second stream with a second sensor, determining a ratio between the measured electrical property of the second stream and the measured electrical property of the first stream, and using the ratio as an indicator for the exhaustion state of the filter, wherein the filter includes an ion exchange resin operated in $H^+$-mode, and the filter is buffered with at least one salt selected from the group of a potassium salt ($K^+$), a sodium salt ($Na^+$) and a lithium salt ($Li^+$).

DETAILED DESCRIPTION

Figure 1:
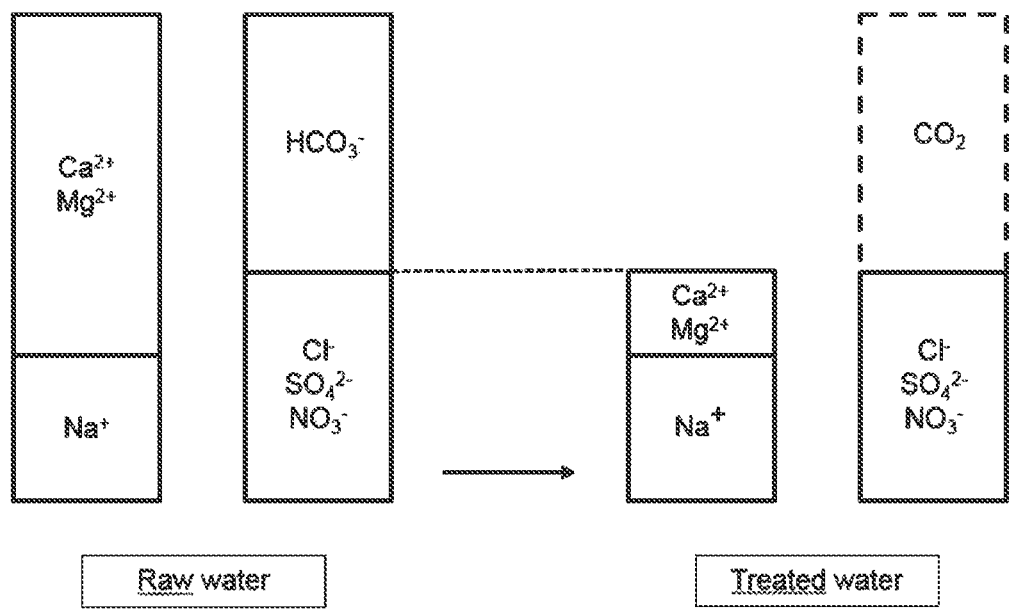
FIG. 1 illustrates the general process of ion exchange during operation of a water softening device containing a filter comprising a non-buffered WAC resin.

We discovered that the result of measurements of electrical properties of the water passed through a filter comprising a cation exchange material may serve as an indicator for the exhaustion state of the filter. Compared to the direct determination of pH values, measurements of the electrical conductivity are advantageous. The cost of sensors for the measurements of electrical properties, including the electronics needed to operate them, is considerably lower than for the equipment needed for pH measurements. In addition, sensors for the measurements of electrical properties usually require only a one time calibration.

Our water softening device comprises
a filter configured to decrease hardness of a first stream of raw water to produce a second stream of water with decreased hardness,
a first sensor that measures an electrical property of the first stream, and
a second sensor that measures an electrical property of the second stream.

The water softening device may further comprise a third sensor that detects a water flow through the filter. However, this feature is optional.

Preferably, the water softening device comprises at least one of:
the device comprises a base unit,
the first sensor, the second sensor and, optionally, if the device comprises the third sensor also the third sensor, are integral parts of the base unit, and
the filter is configured as exchangeable filter detachably connectable to the base unit.

Thus, it is preferred that the device has a modular design. The base unit can comprise all components that do not exhaust during operation. The filter may comprise only a cation exchange material subject to exhaustion during operation of the device. When exhaustion occurs, the filter can be replaced. In contrast, the base unit is reusable.

Further preferably, the water softening device may be characterized by at least one of:
the base unit and the filter are connected via a screw connection,
the filter comprises an inlet for the first stream and an outlet for the second stream,
the base unit comprises an inlet line for the first stream and an outlet line for the second stream, and
the inlet line of the base unit is coupled to the inlet of the filter and the outlet line of the base unit is coupled to the outlet of the filter.

A screw connection can provide a very reliable and leakproof connection between the base unit and the filter. It is preferred that the filter comprises an opening part with an external thread whereas the base unit comprises a receptacle for the filter with an internal thread, wherein form and dimensions of the threads are matched to one another. The opening provides access to the filter's inlet for the first stream and the outlet for the second stream. The receptacle comprises an entry into the base unit's outlet line. In addition, the base unit's inlet line opens into the receptacle. Preferably the opening and the receptacle are interrelated and adjusted to one another such that the inlet line of the base unit is coupled to the inlet of the filter and the outlet line of the base unit is coupled to the outlet of the filter when the opening part with the external thread is screwed into the receptacle.

To provide leakproofness, one or more sealing compounds, in particular one or more sealing rings, are preferably arranged at the interface between the filter and the base unit.

Of course, it is also possible to connect the base unit and the filter by other technical means, for example, by a simple snap connection.

Further preferably, the water softening device may be characterized by at least one of:
the first sensor and/or the second sensor are configured to measure an electrical conductivity and/or an electrical resistance,
the first sensor is configured as an electrolytic cell capable of applying a current to the first stream,
the second sensor is configured as an electrolytic cell capable of applying a current to the second stream,
the first sensor is positioned within the inlet line of the base unit or at an entry of the inlet line of the base unit,
the second sensor is positioned within the outlet line of the base unit or at an entry of the outlet line of the base unit, and
the optional third sensor is, if present, positioned within the inlet line of the base unit or at an entry of the inlet line of the base unit or within the outlet line of the base unit or at an entry of the outlet line of the base unit.

Generally, it is preferred that the first sensor and the second sensor are configured to measure an electrical conductivity. Sensors suitable for measuring the electrical conductivity of water, in particular electrolytic cells suitable for measuring the electrical conductivity of water, are known and need no further explanation.

Further preferably, the water softening device may be characterized by at least one of:
the device comprises an electronic controller connected to the first sensor, to the second sensor and, optionally, if the device comprises the third sensor, to this third sensor,
the electronic controller comprises an internal data memory and a data processing unit, and
the electronic controller is an integral part of the base unit.

It is preferred that the device is characterized by a combination of all of these features. Preferably the electronic control unit and all sensors are integral parts of the base unit.

Further preferably, the water softening device may be characterized by at least one of the following additional features:
the filter comprises an ion exchange resin,
the filter comprises a cartridge in which the ion exchange resin is contained, wherein the cartridge preferably consists of plastic,
the ion exchange resin is a weak acid cationic ion exchange resin (WAC resin),
the ion exchange resin is operated in $H^+$-mode,
the ion exchange resin is buffered, and
the ion exchange resin is buffered with at least one salt, in particular with at least one salt selected from the group of a potassium salt ($K^+$), a sodium salt ($Na^+$) and a lithium salt ($Li^+$).

In preferred examples of the method, buffering the ion exchange resin is of high importance. It is particularly preferred that the ion exchange resin is a buffered WAC resin, in particular a WAC resin buffered with at least one salt selected from the group of a potassium salt ($K^+$), a sodium salt ($Na^+$) and a lithium salt ($Li^+$). If the WAC resin is buffered, it contains—besides $H^+$ ions—an amount of metallic cations, in particular $K^+$, $Na^+$ and/or $Li^+$.

Further preferably, the water softening device may be characterized by at least one of:
the device comprises a bypass line that mixes the second stream with water of the first stream,
the bypass line connects the inlet line of the base unit with the outlet line of the base unit,
the bypass line comprises a valve to regulate the amount of water of the first stream mixed to the second stream, and
the bypass line is integrated into the base unit.

Via the bypass line, the second stream can be blended with water of the first stream. This may become useful if, for example, as a result of the treatment with the water softening device the pH of the second stream drops too far.

Further preferably, the water softening device may be characterized by at least one of:
- the device comprises a filter replacement indicator configured to indicate that the filter has reached the end of its lifetime or is near to the end of its lifetime,
- the replacement indicator is an optical signaling device and/or a sounder,
- the filter replacement indicator is an integral part of the base unit,
- the filter replacement indicator connect to the electronic control unit, and
- the electronic control unit is configured to trigger the replacement indicator to issue a warning signal in dependence from electrical properties of the first and the second stream measured by the first and the second sensor.

It is preferred that the device is characterized by a combination of all of these features. Such a device is not only capable of determining an exhaustion state of a filter. Moreover, it is capable of issuing a warning signal to give information to the operator that the filter is coming to the end of its lifetime and will need to be replaced soon.

Further preferably, the water softening device may be characterized by at least one of:
- the device comprises a mount for stationary installation of the base unit, and
- the mount comprises one or more holes and connects or is connectable to the base unit.

It is possible to position the base unit in a fixed, stationary position via the mount. During operation, only the filter has to be exchanged.

The method operates a water softening device. Preferably, the device operated according to the method is a device like the one described above. It comprises the steps of
- passing a first stream of raw water through a filter configured to decrease hardness of the stream to produce a second stream of water with decreased hardness,
- measuring an electrical property of the first stream with a first sensor,
- measuring an electrical property of the second stream with a second sensor,
- determining a ratio between the measured electrical property of the second stream and the measured electrical property of the first stream and
- using the ratio as an indicator for the exhaustion state of the filter.

Preferably, measuring the electric properties of the first and the second stream is accomplished simultaneously or in a defined delay.

Preferably, the method may be characterized by at least one of:
- the measured electrical properties are the electrical conductivity or the electrical resistance of the first and the second stream, and
- the ratio is the ratio between the electrical conductivity of the second stream and the electrical conductivity of the first stream.

In practice, it is also possible to form a ratio between the electrical conductivity of the first stream and the electrical conductivity of the second stream (and not vice versa, namely between the electrical conductivity of the second stream and the electrical conductivity of the first stream). In both examples, a ratio is obtained that may be used as an indicator for the exhaustion state of the filter.

Further preferably the method may be characterized:
- the filter comprises an ion exchange resin which is buffered,
- a sequence of measurements of the electrical conductivities of the first and the second stream is conducted,
- from the results of each of the measurements the ratio between the electrical conductivity of the second stream and the electrical conductivity of the first stream is determined, thereby obtaining a sequence of ratios,
- the lowest ratio ratio_min is determined, and
- a threshold value ratio_exhaust is determined as a function of ratio_min.

The threshold value ratio_exhaust corresponds to a pH value at which the filter needs to be replaced. As initially mentioned, this is usually at a pH value of 6.8. Thus, in this example ratio_exhaust could also be named ratio_6.8.

Further preferably, the method may be characterized by at least one of:
- a threshold value ratio_exhaust is calculated according to the formula:

$$\text{ratio\_exhaust} = a * \text{ratio\_min} + b,$$

wherein a and b are variables whose values depend on the type, preparation and amount of the buffered ion exchange resin and the properties of the first stream of raw water, and
- a threshold value ratio_exhaust is calculated according to the formula:

$$\text{ratio\_exhaust} = a*(\text{ratio\_min})^2 + b*\text{ratio\_min} + c,$$

wherein a and b and c are variables whose values depend on the type, preparation and amount of the buffered ion exchange resin and the properties of the first stream of raw water.

Further preferably, the method may be characterized by at least one of:
- the threshold value ratio_warning is a predetermined value,
- the threshold value ratio_warning is calculated from data obtained by the measurements of the electrical properties of the first and the second stream,
- the threshold value ratio_warning is calculated from the ratio between the electrical conductivity of the second stream and the electrical conductivity of the first stream, and
- the threshold value ratio_warning is determined as a function of ratio_exhaust.

Further features and advantages can be derived from the figures and the following detailed description of preferred examples. The preferred examples described are merely for the purposes of illustration and to give a better understanding and shall not in any way constitute a restriction on the scope of this disclosure.

(1) General Process of Ion Exchange with a WAC Resin

For most natural water encountered, the total hardness TH (TH corresponds to the sum of the concentrations of $Ca^{2+}$ and $Mg^{2+}$ ions in the water: $TH=[Ca^{2+}]+[Mg^{2+}]$) is higher than the alkalinity Alk. (the alkalinity is proportional to the concentration of $HCO_3^-$ ions: Alk. $\sim[HCO_3^-]$) so that the ratio TH/Alkalinity>1. Such water treated over a WAC resin bed operated under H+ form, reacts as follows:

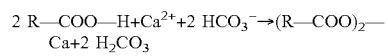
$$2\ R\text{—}COO\text{—}H + Ca^{2+} + 2\ HCO_3^- \rightarrow (R\text{—}COO)_2\text{—}Ca + 2\ H_2CO_3$$

The $H^+$ ions fixed on the WAC resin are exchanged against hardness ($Ca^{2+}$ and $Mg^{2+}$). The $H^+$ ions given by the resin will then react with the alkalinity ($HCO_3^-$) to be transformed into $CO_2$ ($H_2CO_3$). In other words, the hardness will be exchanged up to the alkalinity concentration.

The process, also known as de-alkalization, is quantitatively illustrated in FIG. 1. It is governed by the ratio of TH to Alk. To avoid the pH of the treated water dropping to a too low value, it is possible, sometimes even advisable, to mix the treated water with a defined percentage of the raw water (for ex. 10 to 70%). The bypass setting is usually a consequence of the raw water composition that governs the WAC resin reaction and the composition of the treated water.

(2) Preferred Example of a Device

Figure 2:
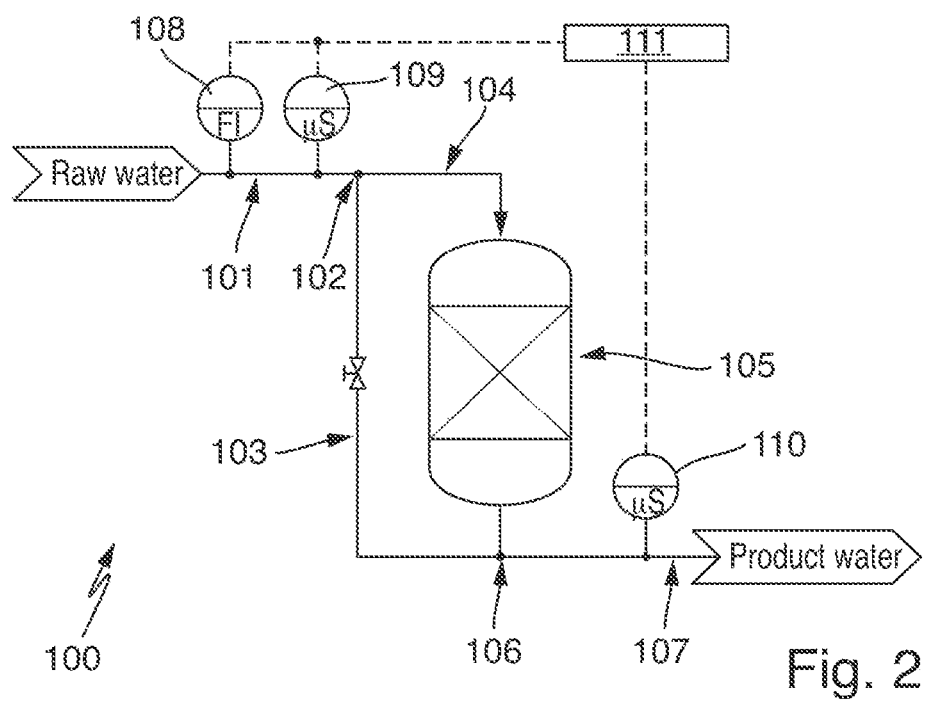
FIG. 2 illustrates schematically the most important features of a preferred example of a water softening device.

The device 100 shown in FIG. 2 comprises an inlet line 101 for a first stream of raw water. The first stream of raw water is split into two partial streams at the junction 102. One of the partial streams is led via line 104 to the filter 105. The other partial stream flows through the bypass line 103. The ratio between the two partial streams is regulated by the valve 112.

The filter 105 contains a WAC resin bed operated under $H^+$ form. When water flows through the filter 105, $H^+$ ions fixed on the WAC resin are exchanged against hardness. At junction 106, water that has exited from the filter 105 can be blended with raw water from the bypass line 103. The water can exit from the device 100 via outlet line 107.

The device 100 comprises two sensors 109 and 110 that measure electrical conductivity of the water flowing through the device. Sensor 109 is positioned at the inlet line 101. Sensor 110 is positioned at the outlet line 107. In addition to this, device 100 comprises sensor 108 that detects a water flow through the filter 105. The sensor 108 gives information about the presence of a water flow through the filter 105. The sensors 108 to 110 connect to the electronic control unit 111.

With the help of the sensors 109 and 110 it is possible to determine a ratio between the electrical conductivity of softened water having at least partially been treated in the filter 105 and the electrical conductivity of the raw water. After each exchange of the filter 105 a certain time is needed to stabilize the conductivity measurements. Then, the ratio is determined. We found that by monitoring this ratio it is possible to identify a conductivity ratio value that corresponds to a certain pH value. Usually, a filter containing a WAC resin should be replaced when the pH value of the treated water reaches 6.8.

At the beginning of the filter's 105 lifetime, the conductivity ratio will decrease to reach a minimum if the filter 105 contains a buffered WAC resin. After this minimum, the conductivity ratio will start to increase until the end of the filter's 105 lifetime.

(3) Example of a Determination of a Ratio Between the Electrical Conductivity of the Raw Water and the Electrical Conductivity of Softened Water The operation principle of a WAC resin bed operated under H+ form was illustrated by FIG. 1. To avoid the pH of the treated water dropping to a too low value especially at the beginning of the cycle, in addition to the bypass, the ion exchange resin can be buffered with an additional salt that can be any ion that has a lower selectivity than the ions to be exchanged. Usually $K^+$, $Na^+$ and/or $Li^+$ are preferred. In this example, preferably an ion exchange resin buffered with $Na^+$ is used. The sodium quantity for this application can be located in the range from 0.1 mol to 1.0 mol of sodium per liter of ion exchange resin.

The ion exchange resin shows different selectivities for the different ions present in the solution. For a WAC resin the selectivity is usually as follows:

$K^+ < Na^+ < Li^+ < Mg^{2+} < Ca^{2+} < H^+$

This means that for a WAC resin regenerated under $H^+$ form and buffered with any additional salt with lower selectivity than the ions to be exchanged (ex: $Na^+$ buffer for $Ca^{2+}$ and $Mg^{2+}$ removal), hardness would be preferentially exchanged against the buffering ion $Na^+$, because of the resin selectivity. When the available buffering ions $Na^+$ are exchanged, the regular de-alkalisation process occurs. The $Ca^{2+}$ and $Mg^{2+}$ are exchanged against $H^+$ that will react with the alkalinity to be transformed into $CO_2$. The buffering ion (ex: $Na^+$) release is leading to a smoother $H^+$ release at the beginning of the cycle that contributes avoiding the pH to drop to a lower value.

At the beginning of the cycle, the WAC resin will exchange mostly the buffering ion (ex: $Na^+$) against $Ca^{2+}$ and $Mg^{2+}$, but also $H^+$ as described above. As far as the amount of water passed through the filter will increase, the quantity of buffering ion (ex: $Na^+$) exchanged against $Ca^{2+}$ and $Mg^{2+}$ will decrease, while the amount of $H^+$ will increase. This will lead to a decrease of the pH at the beginning of the cycle, limited by the buffer ion release. As a part of the alkalinity will be transformed into $CO_2$, the $HCO_3^-$ concentration will also decrease. At same time, the hardness leakage will start to increase accordingly.

Once all the loaded buffer ions have been released, an inflection of the curves occurs. The pH will start to increase until the complete exhaustion of the filter. It means at the beginning of the cycle, the pH will pass by a minimum value (ratio_min) and then increase to reach the ratio corresponding to a pH of 6.8 (ratio_6.8 or ratio_exchange, compare above), the criteria for filter replacement.

We conducted experiments with a filter containing a WAC resin buffered with $Na^+$ from 0.1 to 1.0 mol per liter resin. A stream of raw water has been passed through the filter. The composition of the raw water at the filter inlet was analyzed:

| | | |
|---|---|---|
| T = | 20° C. | |
| pH = | 7.68 | |
| Alkalinity = | 4.77 | meq/l |
| $Ca^{2+}$ = | 4.70 | meq/l |
| $Mg^{2+}$ = | 0.41 | meq/l |
| $Na^+$ = | 0.17 | meq/l |
| $K^+$ = | 0.05 | meq/l |
| $NO_3^-$ = | 0.25 | meq/l |
| $Cl^-$ = | 0.25 | meq/l |
| $SO_4^{2-}$ = | 0.36 | meq/l |

In the experiment, the filter was brought to complete exhaustion. A water stream was passed through the filter until the outlet water composition was similar to the inlet composition. The electrical conductivity of the water stream was continuously monitored at the inlet of the filter and at the outlet.

Figure 3:
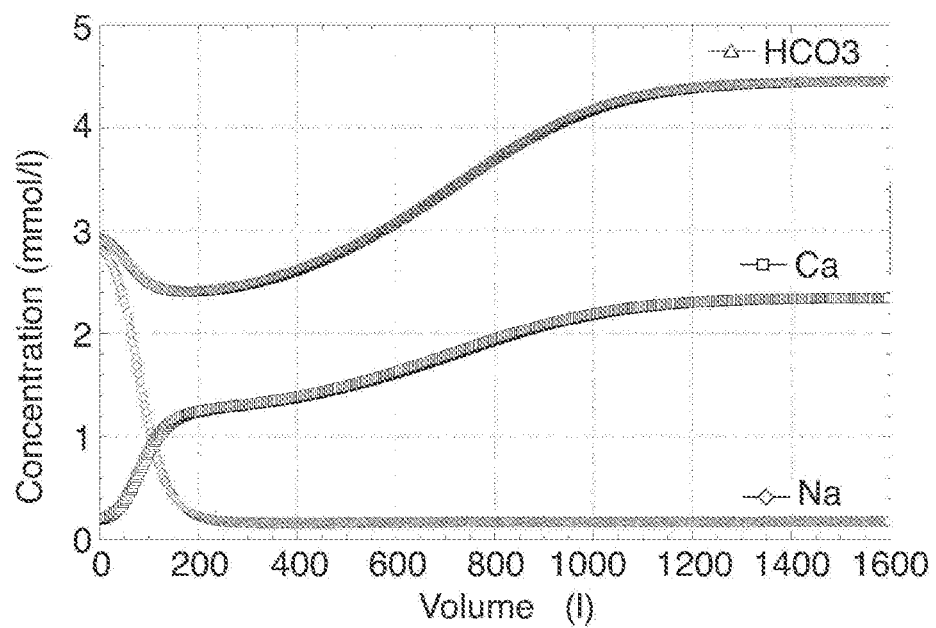
FIG. 3 illustrates the change of concentration of the ion species $Ca^{2+}$, $Na^+$ and $HCO_3^-$ in a water stream passed through a filter containing a WAC resin buffered with a sodium salt as a function of the volume passed through the filter.
Figure 4:
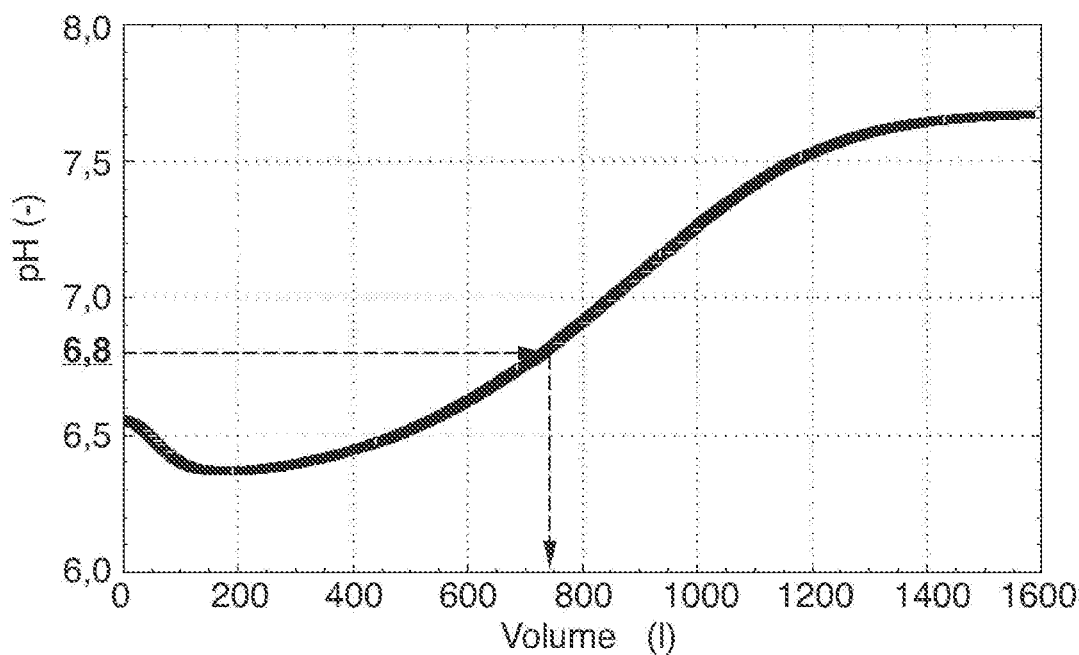
FIG. 4 illustrates the change of pH of water passed through a filter containing a WAC resin buffered with a sodium salt as a function of the volume passed through the filter.
Figure 5:
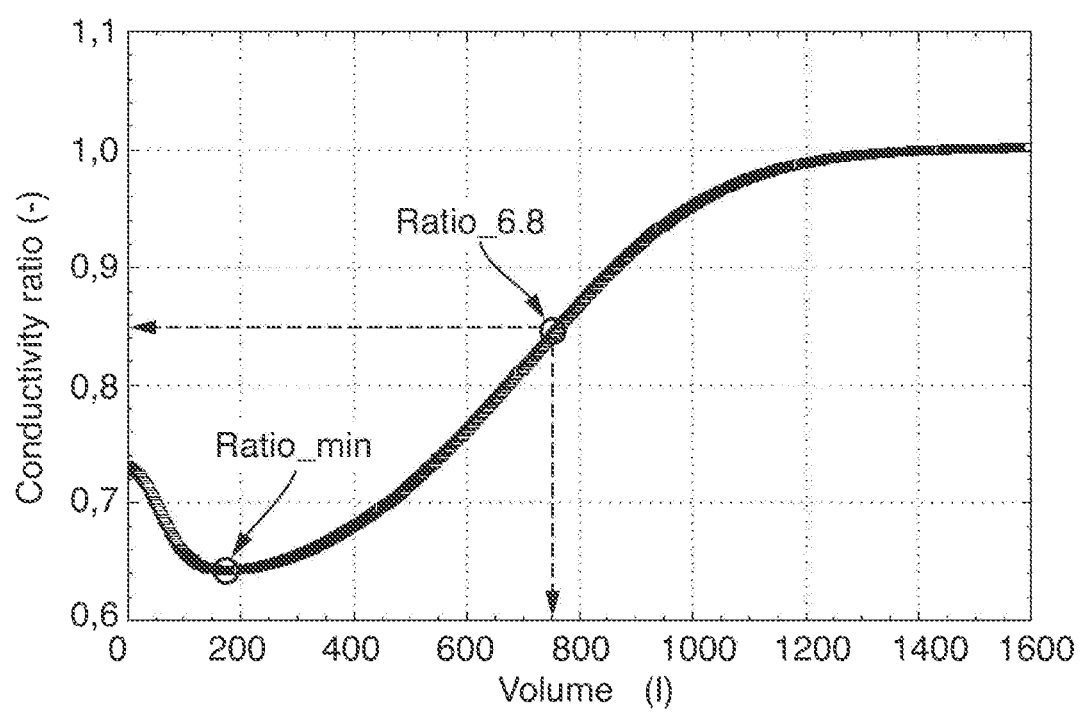
FIG. 5 illustrates the change of the electrical conductivity of water passed through a filter containing a WAC resin buffered with a sodium salt as a function of the volume passed through the filter.

FIG. 3 illustrates the change of concentration of the ion species $Ca^{2+}$, $Na^+$ and $HCO_3^-$ in the water stream passed through the filter. FIG. 4 illustrates the change of pH of the water passed through the filter. FIG. 5 illustrates the change of the ratio of the electrical conductivity of the water passed through the filter and the electrical conductivity of the raw water.

From the three curves in FIGS. 3-5 it becomes evident that the $HCO_3^-$ concentration, the pH and the ratio of the electrical conductivities are following the same evolution. In fact, the $HCO_3^-$ concentration, the pH and the ratio are linked together. In the experiment the raw water conductivity was stable. As a consequence, the ratio follows the outlet conductivity evolution. The electrical conductivity is proportional to the $HCO_3^-$ concentration which is directly linked to pH and alkalinity according to the calco-carbonic equilibrium.

According to the curve in FIG. 4, the volume corresponding to a pH of 6.8 is about 750 liters. According to the curve in FIG. 5, the ratio corresponding to a volume of 750 liters is about 0.85. Combining this information leads to the conclusion that a pH of 6.8 corresponds to a ratio of 0.85. This is why this ratio is named ratio_6.8. Further, it is possible to extract from the curve in FIG. 5 the lowest ratio, ratio_min, which has a value of 0.64 in this example There is a direct link between the ratio_min and the ratio_6.8. To demonstrate the relation between both, a filter was tested for different water compositions (ratio TH/Alk.). The filter used for the tests had a fixed given amount of WAC ion exchange resin. The resin was always conditioned in the same way, using $Na^+$ as buffer with always the same quantity located between 0.1 and 1.0 mol of $Na^+$ per liter of resin. The bypass was adjusted from 10 to 70% according to the water alkalinity.

Figure 6:
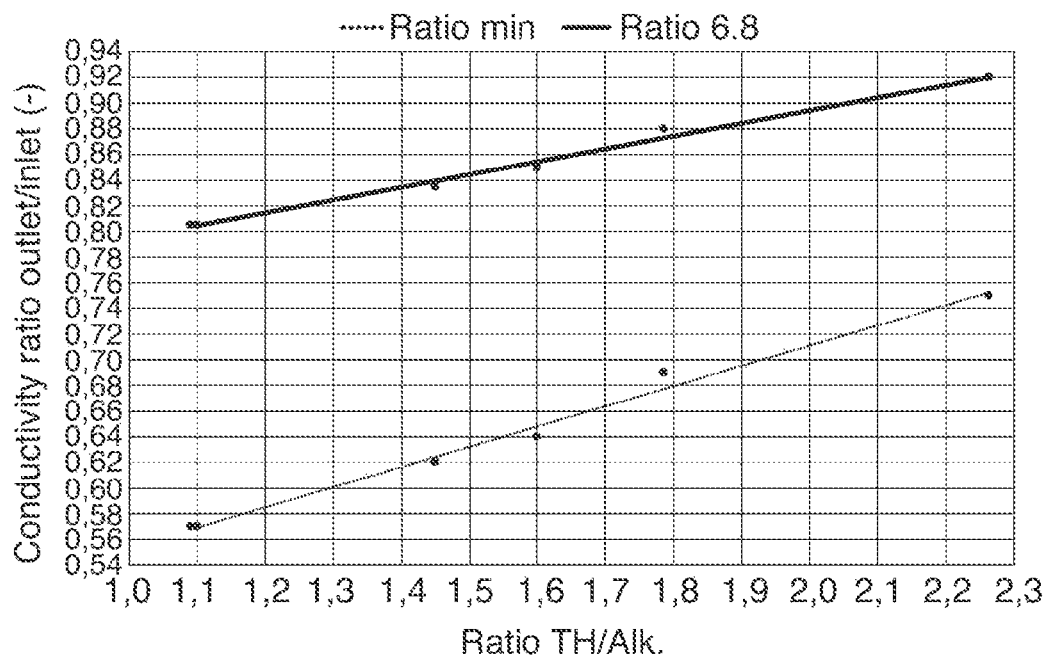
FIG. 6 illustrates the changes of ratio_min and of ratio_6.8 as a function of the ratio TH/Alk.

The results are illustrated in FIG. 6 with the values of ratio_min and ratio_6.8 for the different water compositions, given as a function of the ratio TH/Alk. For the different water compositions tested, the ratio_min and the ratio_6.8 were linear as a function of the ratio TH/Alk. Ratio_min and ratio_6.8 depend on the WAC ion exchange resin used, its capacity and the amount of buffer loaded (here $Na^+$), as well as on the raw water composition, especially the ratio TH/Alk.

This means that for a given WAC resin type, the same amount a buffer loaded on the resin compared to the main regenerant $H^+$ and the same water composition, the ratio_min and ratio_6.8 will always pass by the same values.

Figure 7:
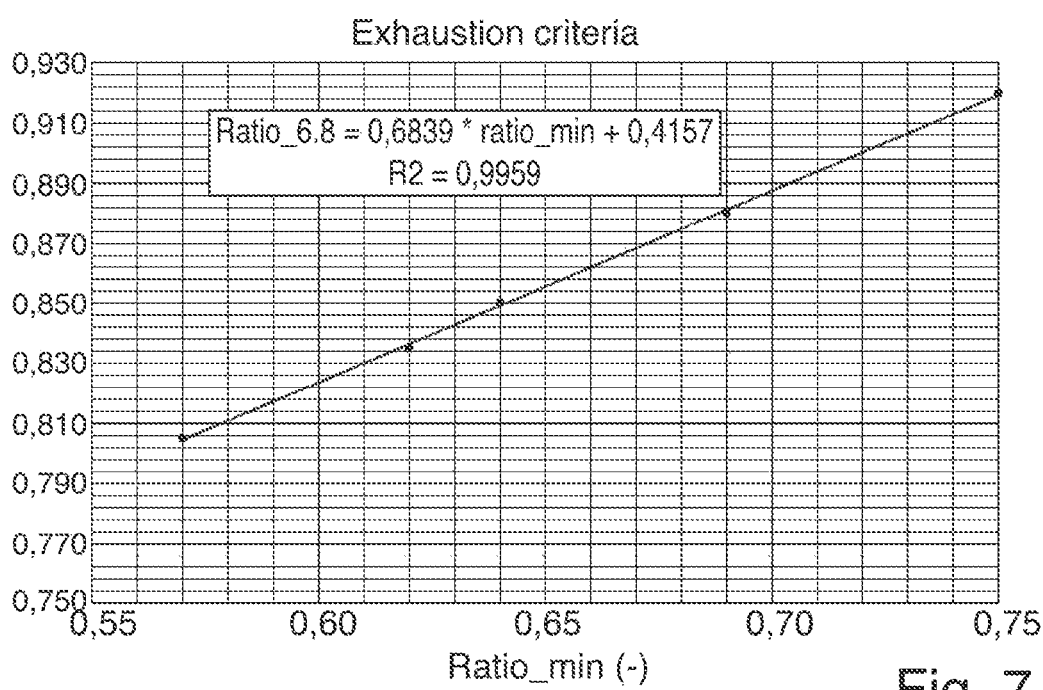
FIG. 7 illustrates the linear relation between the ratio_min and the ratio_6.8.

The fact the ratio_min and the ratio_6.8 are both linear to the ratio TH/Alk. on the considered range leads to the conclusion that there is also a linear relation between the ratio_min and the ratio_6.8. This is illustrated by the curve shown in FIG. 7.

For a given filter size, always using the same amount of WAC ion exchange resin conditioned in the same way, the ratio_6.8 corresponding to the exhaustion point is linear to the ratio_min This curve is characteristic for a defined filter type and can be used as exhaustion criteria. In this example, the exhaustion criteria is:

$$Ratio\_6.8=0.6839*ratio\_min+0.4157$$

Once the ratio_min is known, it is possible to calculate the value for the ratio_6.8 from this equation, which corresponds to the point the filter will need to be replaced. The exhaustion criteria allows to make the correlation between the outlet pH the filter needs to be replaced and the conductivity ratio outlet to inlet.

Considering the described example, on the curve in FIG. 5 the ratio reaches its minimum at a value of 0.64, therefore ratio_min=0.64. Ratio_6.8 can be determined as:

$$Ratio\_6.8=0.6839*0.64+0.4157=0.85$$

It means in this example that when the conductivity ratio will reach a value of 0.85, the outlet pH will be 6.8 and the filter needs to be replaced.

(4) Issuance of a Warning Signal

Once the ratio_min and the ratio_6.8 are known, our device can be configured to determine a warning ratio (ratio_warning) to give information to a user of the device that the filter is coming to the end of its lifetime and will need to be replaced soon. The ratio_warning is calculated as follow from the Δ ratio between the ratio_6.8 and ratio_min:

$$\Delta\ ratio\ 6.8\ to\ min=ratio\_6.8-ratio\_min$$

$$Ratio\_warning=ratio\_6.8-0.1*\Delta\ ratio\ 6.8\ to\ min$$

Considering the described example above, the ratio_warning is:

$$Ratio\_warning=0.85-0.2*(0.85-0.64)=0.81$$

Preferably, the device comprises three LEDs (green, orange and red) as optical signaling devices. The lightning of the LEDs is controlled as follows:

Green ON: ratio_actual<ratio_warning
Orange ON: ratio_warning<ratio_actual<ratio_6.8
Red ON: ratio_actual>ratio_6.8

With the LEDs it is possible to give a warning prior to the filter exhaustion to inform the user that the filter is at the end of its lifetime.

Figure 8:
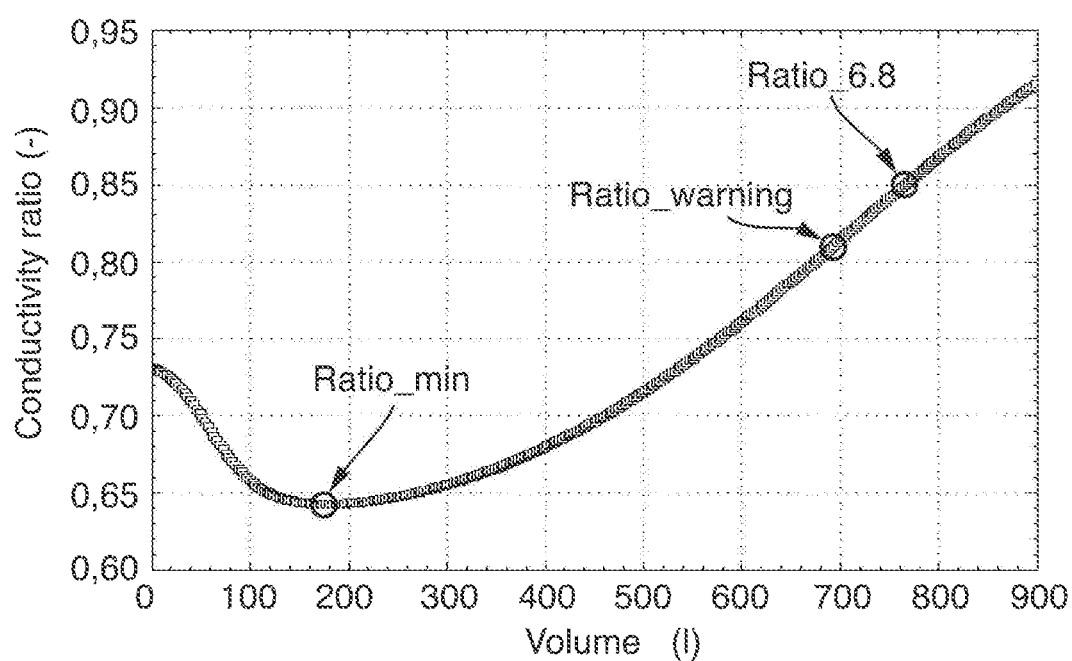
FIG. 8 illustrates the relation between the ratio_min, ration_warning and the ratio_6.8.

The relation between the ratio_min, ration_warning and the ratio_6.8 is illustrated in FIG. 8.

(5) Further Preferred Example of a Water Softening Device

Figure 9:
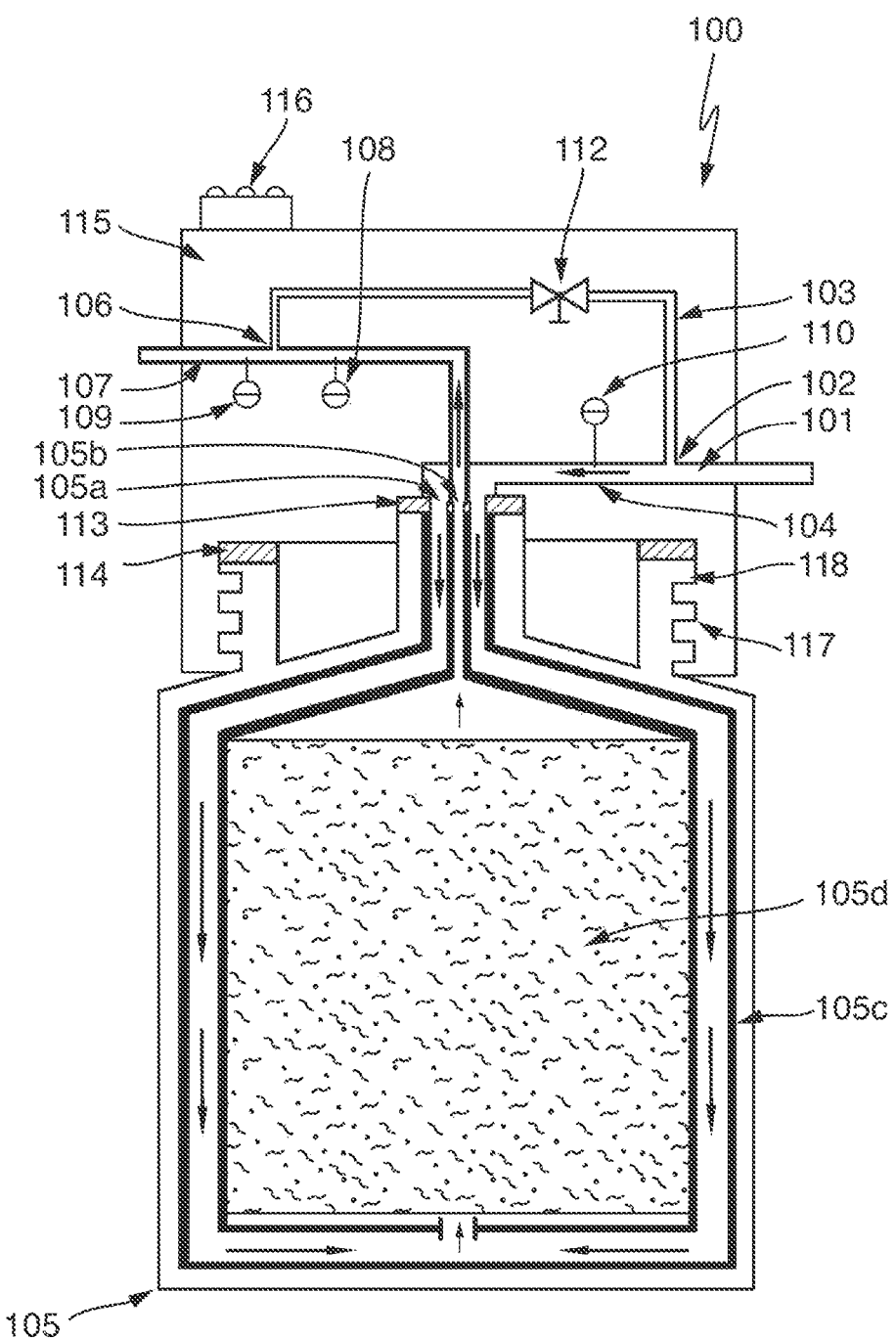
FIG. 9 is a schematic illustration of a cross-section of a further preferred example of a water softening device.

The device 100 shown in FIG. 9 comprises a base unit 115 and an exchangeable filter 105. The base unit 115 and the filter 105 connect via a screw connection. For this purpose, the filter comprises an external thread 117 and the base unit comprises an internal thread 118. To provide leakproofness, the sealing rings 113 and 114 are arranged at an interface between the filter 105 and the base unit 115.

The base unit comprises an inlet line 101 for a first stream of raw water, an outlet line 107 for a second stream of water with decreased hardness exiting from the filter 105 and a bypass line 103. At the junction 102 the first stream of raw water is split into two partial streams. One of the partial streams is led via line 104 to the filter 105. The other partial stream flows through the bypass line 103. The ratio between the two partial streams can be regulated by the valve 112. At the junction 106 water having exited from the filter 105 can be blended with raw water from the bypass line 103. Via the outlet line 107 the water can exit from the device 100. Arrows are used to illustrate the directions in which the water streams flow within the device.

The filter 105 comprises an inlet 105a for the first stream of raw water and an outlet 105b for the second stream of water with decreased hardness. The inlet line 101 of the base unit 115 is coupled to the inlet 105a of the filter 105 and the outlet line 107 of the base unit 115 is coupled to the outlet 105b of the filter 105.

The filter 105 contains a WAC resin 105d operated under $H^+$ form and buffered with $Na^+$. The WAC resin 105d is contained in a cartridge 105c. When water flows through the filter 105, $Na^+$ ions and $H^+$ ions fixed on the WAC resin 105d are exchanged against hardness. Initially, primarily $Na^+$ ions are exchanged. Later, the output of $H^+$ ions increases and the output of $Na^+$ ions decreases.

The device 100 comprises two sensors 109 and 110 that measure electrical conductivity of the water flowing through the device. Sensor 109 is positioned at the outlet line 107. Sensor 110 is positioned at the inlet line 101. In addition, device 100 comprises sensor 108 that detects a water flow through the filter 105. The sensor 108 provides information about the presence of a water flow through the filter 105. The sensors 108 to 110 connect to an electronic control unit 111 as shown in FIG. 2. The electronic control unit is not visible in the cross-section showed in FIG. 9.

The device 100 further comprises 3 LEDs 116 as a filter replacement indicator. With the help of the LEDs 116 it is possible to give a first warning prior to the filter exhaustion to inform the user that the filter is at the end of its lifetime and a second warning when the filter is exhausted, as already described above.

The invention claimed is:

1. A water softening device comprising:
   a. a filter configured to decrease hardness of a first stream of raw water to produce a second stream of water with decreased hardness,
   b. a first sensor that measures an electrical property of the first stream,
   c. a second sensor that measures an electrical property of the second stream, and
   d. optionally, a third sensor that detects a water flow through the filter, wherein
   the filter comprises an ion exchange resin operated in $H^+$-mode, and
   the filter is buffered with at least one salt selected from the group of a potassium salt ($K^+$), a sodium salt ($Na^+$) and a lithium salt ($Li^+$).

2. The water softening device according to claim 1, further comprising:
   a. the device comprises a base unit,
   b. the first sensor, the second sensor and the third sensor are integral parts of the base unit, and
   c. the filter is configured as exchangeable filter which is detachably connectable to the base unit.

3. The water softening device according to claim 2, further comprising:
   a. the filter comprises an inlet for the first stream and an outlet for the second stream,
   b. the base unit comprises an inlet line for the first stream and an outlet line for the second stream, and
   c. the inlet line of the base unit is coupled to the inlet of the filter and the outlet line of the base unit is coupled to the outlet of the filter.

4. The water softening device according to claim 1, further comprising:
   a. the first sensor and/or the second sensor are configured to measure an electrical conductivity and/or an electrical resistance, b. the first sensor is configured as an electrolytic cell capable of applying a current to the first stream, and c. the second sensor is configured as an electrolytic cell capable of applying a current to the second stream.

5. The water softening device according to claim 1, further comprising at least one of:
   a. the device comprises and electronic control unit connected to the first sensor, second sensor and the third sensor, and
   b. the electronic control unit comprises an internal data memory and a data processing unit.

6. The water softening device according to claim 1, further comprising at least one of:
   a. the ion exchange resin is contained in a cartridge, and
   b. the ion exchange resin is a weak acid cationic ion exchange resin.

7. The water softening device according to claim 2, further comprising at least one of:
   a. the device comprises a bypass line that mixes the second stream with water of the first stream,
   b. the bypass line connects the inlet line of the base unit with the outlet line of the base unit,
   c. the bypass line comprises a valve to regulate the amount of water of the first stream mixed to the second stream, and
   d. the bypass line is integrated into the base unit.

8. The water softening device according claim 2, further comprising at least one of:
   a. the device comprises a filter replacement indicator configured to indicate that the filter has reached the end of its lifetime or is near to the end of its lifetime,
   b. the replacement indicator is an optical signaling device and/or a sounder, and
   c. the filter replacement indicator is an integral part of the base unit.

9. The water softening device according to claim 2, further comprising at least one of:
   a. the device comprises a mount for stationary installation of the base unit, and
   b. the mount comprises one or more holes and connects or is connectable to the base unit.

10. A method of operating the water softening device according to claim 1, comprising:
    a. passing a first stream of raw water through a filter configured to decrease hardness of the stream to produce a second stream of water with decreased hardness,
    b. measuring an electrical property of the first stream with a first sensor,
    c. measuring an electrical property of the second stream with a second sensor,
    d. determining a ratio between the measured electrical property of the second stream and the measured electrical property of the first stream, and
    e. using the ratio as an indicator for the exhaustion state of the filter, wherein
    the filter comprises an ion exchange resin operated in $H^+$-mode, and
    the filter is buffered with at least one salt selected from the group of a potassium salt ($K^+$), a sodium salt ($Na^+$) and a lithium salt ($Li^+$).

11. The method according to claim 10, further comprising:
    a. the measured electrical properties are the electrical conductivity or the electrical resistance of the first and the second stream, and
    b. the ratio is the ratio between the electrical conductivity of the second stream and the electrical conductivity of the first stream.

12. The method according to 11, further comprising at least one of:
    a. a sequence of measurements of the electrical conductivities of the first and the second stream is conducted,
    b. from the results of each of the measurements the ratio between the electrical conductivity of the second stream and the electrical conductivity of the first stream is determined, thereby obtaining a sequence of ratios,
    c. the lowest ratio ratio_min is determined, and
    d. a threshold value ratio_exhaust is determined as a function of ratio_min.

13. The method according to claim 12, further comprising one of:
    a. a threshold value ratio_exhaust is calculated according to:

$$\text{ratio\_exhaust} = a * \text{ratio\_min} + b,$$

wherein a and b are variables whose values depend on the type, preparation and amount of the buffered ion exchange resin and the properties of the first stream of raw water, and
    b. a threshold value ratio_exhaust is calculated according to:

$$\text{ratio\_exhaust} = a*(\text{ratio\_min})^2 + b*\text{ratio\_min} + c,$$

wherein a and b and c are variables whose values depend on the type, preparation and amount of the buffered ion exchange resin and the properties of the first stream of raw water.

14. The method according to claim 13, further comprising:
- a. a warning signal is issued when the ratio crosses a threshold value ratio_warning,
- b. the threshold value ratio_warning is a predetermined value,
- c. the threshold value ratio_warning is calculated from data obtained by the measurements of the electrical properties of the first and the second stream,
- d. the threshold value ratio_warning is calculated from the ratio between the electrical conductivity of the second stream and the electrical conductivity of the first stream, and
- e. the threshold value ratio_warning is determined as a function of ratio_exhaust.

15. The water softening device according to claim 2, further comprising the base unit and the filter connect via a screw connection.

16. The water softening device according to claim 1, further comprising:
- a. the first sensor is positioned within the inlet line of the base unit or at an entry of the inlet line of the base unit, and
- b. the second sensor is positioned within the outlet line of the base unit or at an entry of the outlet line of the base unit.

* * * * *